(12) United States Patent
Holub

(10) Patent No.: US 7,308,970 B2
(45) Date of Patent: Dec. 18, 2007

(54) EXTERNALLY SERVICEABLE TRANSMISSION SUMP FILL PIPE AND DRAIN PORT ASSEMBLY

(75) Inventor: Patrick Holub, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 703 days.

(21) Appl. No.: 10/711,026

(22) Filed: Aug. 18, 2004

(65) Prior Publication Data

US 2006/0037427 A1 Feb. 23, 2006

(51) Int. Cl.
*F16N 31/00* (2006.01)
(52) U.S. Cl. ............... 184/106; 184/1.5; 184/105.3
(58) Field of Classification Search ............ 184/106, 184/105.3, 104.1, 104.2, 1.5
See application file for complete search history.

(56) References Cited

U.S. PATENT DOCUMENTS

| 5,048,578 | A | * | 9/1991 | Dorf et al. ............ 141/346 |
| 5,975,244 | A | * | 11/1999 | Mason ............... 184/1.5 |
| 6,237,720 | B1 | * | 5/2001 | Sutton ............... 184/106 |
| 6,941,923 | B2 | * | 9/2005 | Saito ............... 123/196 R |
| 2002/0100641 | A1 | * | 8/2002 | Osman ............... 184/106 |

* cited by examiner

*Primary Examiner*—David M. Fenstermacher
(74) *Attorney, Agent, or Firm*—David B. Kelley; Brooks Kushman P.C.

(57) ABSTRACT

A transmission fluid sump for an automotive transmission comprising a reservoir portion, a threaded extension on the reservoir portion and a fill pipe threadably connected to the extension. A closure member seals a central opening in the extension independently of the fill pipe, thereby avoiding overlapping torque windows for the fill pipe and the closure member while providing a single leak flow path for the transmission fluid.

9 Claims, 2 Drawing Sheets

EXTERNALLY SERVICEABLE TRANSMISSION SUMP FILL PIPE AND DRAIN PORT ASSEMBLY

BACKGROUND OF INVENTION

1. Field of the Invention

The invention relates to an oil reservoir or sump for an automatic transmission mechanism in an automotive vehicle powertrain.

2. Background Art

An automatic power transmission mechanism in a contemporary automotive vehicle powertrain includes a gear system, typically a planetary gear system with multiple gear ratios, fluid pressure actuated friction clutches and brakes to establish and disestablish torque flow paths through the gearing, and a hydrokinetic torque converter including an impeller connected to the crankshaft of an internal combustion engine and a turbine connected drivably to the torque input element of the gear system. A positive displacement transmission pump in a transmission housing has a pump driving element connected to the impeller. When the engine is operating, the pump establishes control pressure for fluid pressure actuators for the friction clutches and brakes as well as lubrication oil pressure.

A transmission reservoir or sump typically is connected to the transmission housing at a location below the transmission gearing for storing transmission fluid. The sump is in fluid communication with an inlet side of the impeller driven transmission pump.

The transmission includes a control valve system, which is supplied with control pressure fluid from the transmission pump. Drainage ports in the valve system allow control pressure fluid to return to the transmission sump where it is filtered and recirculated.

Normal maintenance of the transmission requires the transmission fluid sump to be drained and refilled periodically. Typically, a drum plug and fill pipe assembly is used for the purpose of draining and filling the sump. Other known transmission designs make use of a fill port above the sump and a dip stick to ascertain the level of fluid in the sump. If a transmission fluid drain plug and fill pipe assembly is used, the length of the fill pipe determines the fluid level of the transmission fluid in the sump. A drain plug is integrated with the fill pipe. That design may result in multiple potential fluid leak paths at the sealing interface of the fill pipe with the sump and at the interface of the fill pipe and the plug.

Threaded connections are used with a conventional drain plug and fill pipe assembly for securing the fill pipe to the sump and for securing the plug to the fill pipe. Recommended torque limits for these elements are established for each threaded connection. Typically, the torque limits determine overlapping torque windows for the threaded connections. A torque applied to one element, therefore, may be inconsistent with the recommended torque for the other element. Further, any corrosion at either of the threaded connections will cause differences in the degree of overlap of the two torque windows. Further, known designs of this type have multiple sealing interfaces, each interface creating a potential fluid leak path.

SUMMARY OF THE INVENTION

The invention comprises a fill pipe and drain plug assembly that includes a single sealing interface rather than multiple sealing interfaces typical of known fill pipe and drain plug assemblies. The invention is characterized also by improved corrosion resistance and reduced weight in comparison to known designs.

The fill pipe and drain plug assembly of the invention may be made of thermoset material or thermoplastic material, such as glass-filled Nylon, and the sump may be formed as a molded oil pan using, for example, any of various known thermoset or thermoplastic materials.

The fill pipe is secured by threads in a threaded opening in the sump. It is threaded into the bottom of the pan until it bottoms on a shoulder on the fill pipe. No seal is required at this interface. A drain plug installed within the threaded opening forms a plug sealing interface with the pan.

When filling of the sump is required, the plug can be removed and transmission fluid can be added to the sump through the fill pipe using a fill adapter that may be threaded into the pan threads rather than into the fill pipe itself. Because of this design of the fill pipe and the drain plug, a conventional externally threaded plug may be used. The fill pipe itself can be removed and reinstalled from outside the transmission without requiring removal of the pan.

In addition to overcoming the leakage problem associated with multiple sealing interfaces of known designs, the design of the present invention avoids problems associated with torquing and loosening of a concentric plug, a fill pipe and a fill adapter. Each threaded element of the design can be torqued during assembly independently of the torque requirements of other elements of the assembly.

DETAILED DESCRIPTION OF THE PREFERRED EMBODIMENT(S)

Figure 1:
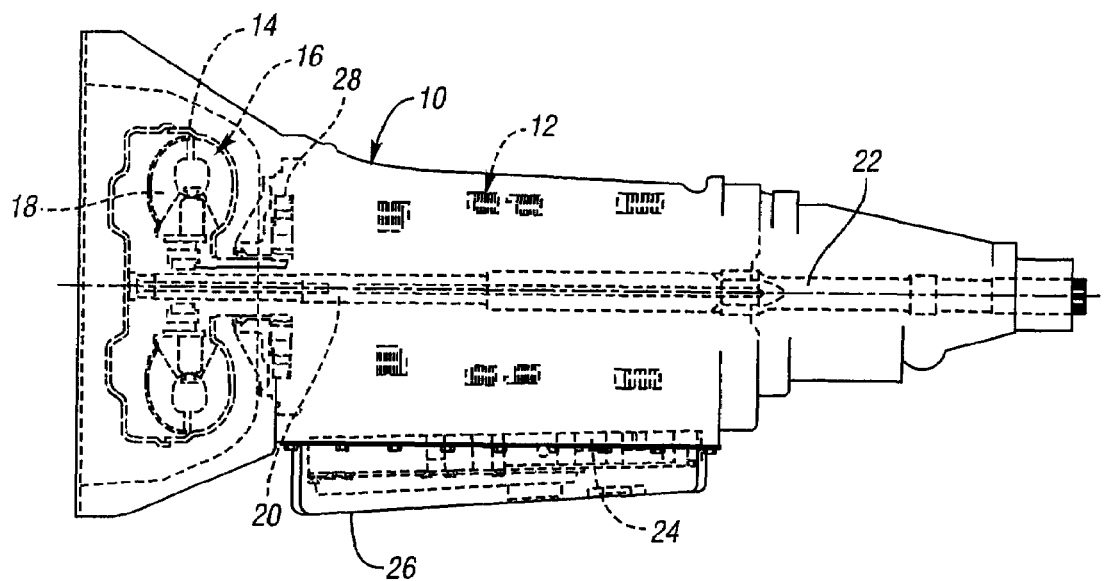
FIG. 1 is a cross-sectional view, largely in schematic form, of an automatic vehicle transmission for an automotive vehicle driveline with a transmission oil sump located at the lower side of the transmission housing.

FIG. 1 shows, in schematic, cross-sectional form, a typical automatic transmission of the kind currently used with rear wheel drive automotive vehicles. FIG. 1 is included in the disclosure to illustrate a structural environment for the transmission fluid fill pipe and drain plug assembly of the invention. Although FIG. 1 illustrates a transmission for a rear wheel drive vehicle, the invention may be used as well in a transmission of a so-called transaxle type, wherein engine torque is delivered to forward traction wheels of the vehicle.

Numeral 10 in FIG. 1 designates an automatic transmission housing. Enclosed in the housing 10 is a planetary gear system 12, which includes friction clutches and brakes for establishing and disestablishing torque flow paths through planetary gear elements. The friction clutches and brakes are actuated by fluid pressure operated actuators in known fashion.

Engine torque is delivered to the impeller 14 of a hydrokinetic torque converter 16. A turbine 18 of the torque converter 16 delivers torque to a turbine shaft 20, and the planetary gear system 12 distributes turbine torque to torque output shaft 22.

A control valve body, schematically shown at 24, is located in a transmission fluid reservoir or sump 26. Transmission fluid in sump 26 is distributed by valve elements in the control valve body to fluid pressure actuators for the planetary gear system. A positive displacement pump 28 for developing control valve circuit pressure for the control valve elements is driven by the impeller 14. A fluid inlet port (not shown) for the pump 28 communicates with the transmission fluid in the sump 26.

Figure 2:
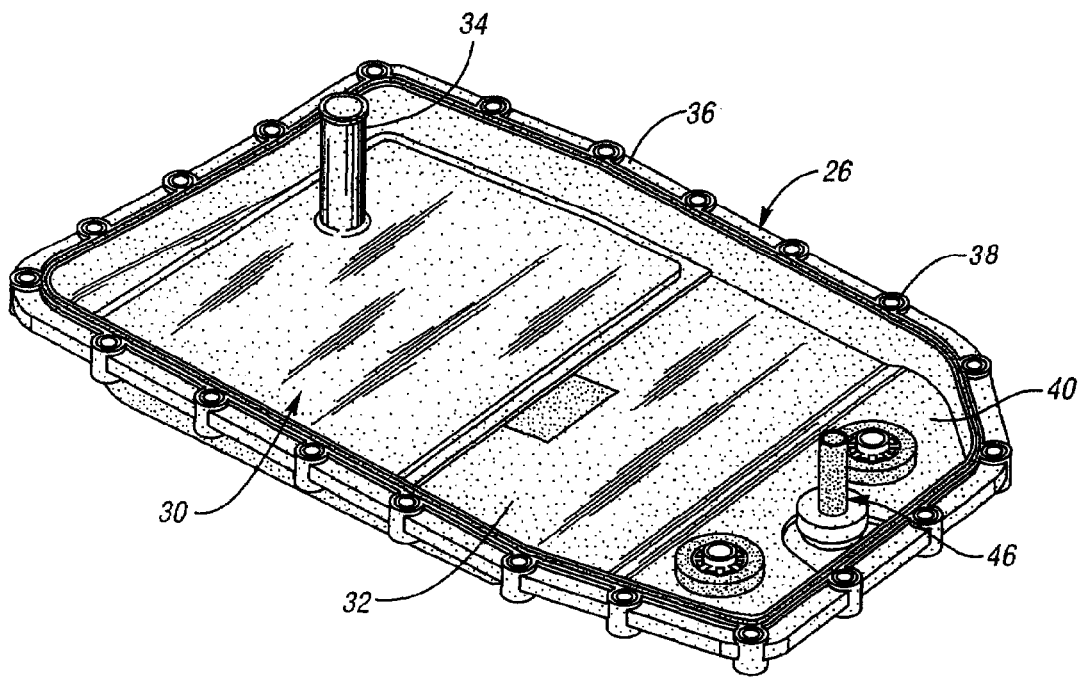
FIG. 2 is an isometric view of a transmission reservoir or sump for a transmission of the type shown in FIG. 1.

FIG. 2 is an isometric view of the transmission fluid sump 26 of the invention. The sump 26 sometimes is referred to as an oil pan. It may be formed by a molding process using a glass-filled Nylon plastic material, although other moldable materials may be used as well. It comprises a pump inlet structure and fluid filter assembly 30 secured to the bottom surface 32 of the sump 26. A vertical fluid supply pipe 34 is secured at one end to the filter assembly 30. When the sump 26 is assembled to the lower side of the transmission housing 10, the pipe 34 will communicate with pump inlet passages extending to the positive displacement pump 28.

Figure 4:
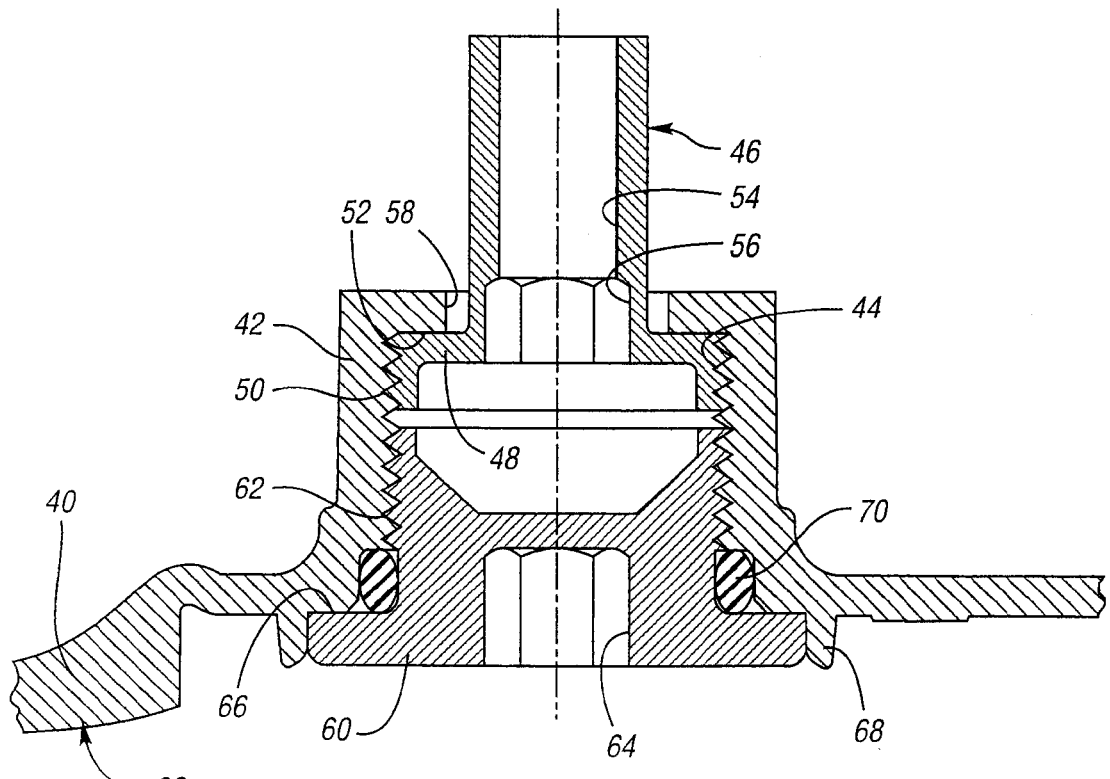
FIG. 4 is a cross-sectional view of a Nylon drain plug and fill pipe assembly embodying features of the present invention.

The sump 26 includes a peripheral margin 36 that can be bolted with peripherally spaced bolts at 38 to the lower side of the transmission housing 10. A gasket may be positioned on the peripheral margin 36. A fill pipe, which will be described subsequently with reference to FIG. 4, is secured to the sump 26 at a surface portion 40, which may be lower than the surface 32.

Figure 3:
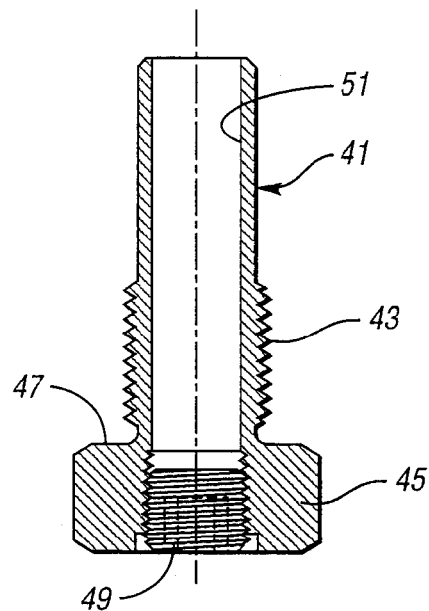
FIG. 3 is a cross-sectional view of a known steel plug and fill pipe assembly for a transmission with a sump located below the transmission gearing.

FIG. 3 shows at 41 a known fill pipe and drain plug construction made of steel. It includes an upstanding portion and a threaded portion 43, which is threadably received in an internally threaded opening in the lowermost surface of the sump. Fill pipe 41 has a head, preferably a hexagonal head 45, which can be tightened with a hand tool as the threaded portion is received in the internally threaded oil pan. A sealing surface 47 supports a seal to prevent leakage from the sump.

An externally threaded plug 49 is received in an internally threaded end of fill pipe opening 51. Provision is made for sealing the plug to prevent leakage from the oil pan. Thus, there are two potential leak flow paths for the design of FIG. 3 that must be dealt with. As the fill pipe and plug assembly are put in place, the torque limits specified for torquing the fill pipe 41 may not be compatible with the torque limits specified for the plug 49. Further, the steel construction of the design of FIG. 3 causes a corrosion problem after the transmission has been in service, which exacerbates the problem of avoiding leakage through multiple leak flow paths. Further, rotation of the fill pipe 41 must be prevented when the plug 49 is tightened during assembly or is loosened to permit drainage.

Opening 51, when the plug 49 is removed, is used to fill the sump. The level of the fluid in the sump is determined by the height of the fill pipe 41. During the filling process, the maximum fluid level in the sump is determined when back-flow of fluid through the fill pipe opening 51 occurs. The level of the fluid in the sump can be adjusted by replacing the fill pipe with a fill pipe of different height.

The fill pipe design of FIG. 4 embodies the present invention. In FIG. 4, the sump 26 includes an upward pedestal or extension 42 rising from the internal surface portion 40 within the transmission sump. Extension 42 has a central opening that is internally threaded, as shown at 44. A plastic fill pipe 46, which may be nylon, has a lower shoulder 48 with external threads 50 that threadably engage the internal threads 44. The shoulder 48 engages an annular shoulder 52 formed on the extension 42 when the fill pipe 46 is installed as shown in FIG. 4. The internal opening 54 in the fill pipe 46 can be provided with a hexagonal socket portion 56 to receive a hexagonal wrench for tightening the fill pipe 46 after the fill pipe is inserted from the exterior of the sump through opening 58 in the extension 42.

A Nylon closure member 60, with external threads 62, is threadably received in the threaded opening of the extension 42. As in the case of the fill pipe 46, the closure member 60 can be provided with a hexagonal socket portion 64 for accommodating a wrench for tightening the closure member 60 within the extension 42. The closure member 60 has an annular shoulder 66, which engages the sump outer wall. An annular shoulder 68 can be formed on the sump 26 around the head of the closure member 60. The shoulder 68 and the head of the closure member 60 may be formed, in known fashion, with interlocking teeth to prevent unwanted rotation of the closure member after it has been threaded securely in place. An O-ring seal may be located at the interface of the shoulder 66 of the closure member 60 and the surrounding wall of the sump 26.

Only a single potential leak flow path exists in the assembly of FIG. 4. That leak flow path is at the interface of the shoulder 66 and the exterior surface of the sump 26. The O-ring seal 70 effectively prevents leakage of fluid from the sump past the closure member 60.

The fill pipe 46 is threaded into the extension 42 independently of the threaded connection of the closure member 60 with the extension 42. Thus, each threaded connection may have its independent torque limit specifications. There are no overlapping torque windows for the threaded connections for the fill pipe and the closure member.

The construction of FIG. 4 has significantly reduced weight and lower cost in comparison to the steel fill pipe construction of FIG. 3.

The construction of FIG. 4 makes it possible to fill the sump to a level determined by the height of the fill pipe 46 by introducing transmission fluid through the fill pipe. When the sump must be drained, the closure member 60 can be removed using a simple hand wrench, followed by removal of the fill pipe 46. This operation makes it unnecessary to remove the sump 26 from the lower side of the transmission housing. The sump can be refilled by reinserting the fill pipe 46. When the sump is filled to the level determined by the fill pipe 46, the closure member 60 is applied and tightened with a specified torque.

Tightening or loosening of the closure member 60 has no effect on the fill pipe 46. If adjustment of the transmission fluid level is required, it is merely necessary to remove the closure member 60 and the fill pipe 46. Fill pipe 46 then can be replaced with a fill pipe of a different length depending upon the level that is desired. These operations, again, can occur without removal of the sump from the lower side of the transmission housing.

Although an embodiment of the invention has been disclosed, it will be apparent to a person skilled in the art that modifications may be made without departing from the scope of the invention. All such modifications and equivalents thereof are intended to be covered by the following claims.

The invention claimed is:

1. A transmission fluid sump for an automotive transmission having a housing, a gear system in the transmission housing that defines torque flow paths from a driving shaft to a driven shaft, the transmission fluid sump comprising:

a reservoir portion for transmission fluid secured to a lower side of the transmission housing;

a threaded fill pipe extending vertically within the sump, the fill pipe having a central opening for accommodating filling of the reservoir portion with transmission fluid;

a shoulder on the fill pipe;

an upwardly extending sump extension within the reservoir portion;

an internally threaded opening in the sump extension;

a sump extension shoulder engaging the fill pipe shoulder when the fill pipe is threadably received in the internally threaded opening; and a closure member received in the sump extension opening, the closure member having a seal surface engageable with the reservoir portion.

2. A transmission fluid sump for an automotive transmission having a housing and a gear system in the transmission housing that defines torque flow paths from a driving shaft to a driven shaft, the transmission fluid sump comprising:

a reservoir portion for transmission fluid secured to a lower side of the transmission housing;

a threaded fill pipe extending vertically within the sump, the fill pipe having a central opening for accommodating filling of the reservoir portion with transmission fluid;

a shoulder on the fill pipe;

an upwardly extending sump extension within the reservoir portion;

an internally threaded opening in the sump extension;

a sump extension shoulder engaging the fill pipe shoulder when the fill pipe is threadably received in the internally threaded opening;

a closure member received in the sump extension threaded opening; and means for establishing a fluid seal between the closure member and the sump extension.

3. The transmission fluid sump set forth in claim 1 including a seal ring between the seal surface of the closure member and the reservoir portion, the closure member defining a single potential leak flow path for transmission fluid in the sump.

4. The transmission fluid sump set forth in claim 2 wherein the fill pipe and the closure member have independent threaded connections with the sump extension whereby tightening torque limits for the fill pipe may be specified independently of tightening torque limits for the closure member.

5. The transmission fluid sump set forth in claim 4 wherein the fill pipe is formed with a recess to accommodate a hand wrench for tightening the connection of the fill pipe with the sump.

6. The transmission fluid sump set forth in claim 4 wherein the closure member is formed with a recess to accommodate a hand wrench for tightening the connection of the closure member with the sump.

7. The transmission fluid sump set forth in claim 2 wherein the reservoir portion, the fill pipe, and the closure member are formed from a moldable thermoplastic material, thereby eliminating corrosion and minimizing weight.

8. The transmission fluid sump set forth in claim 2 wherein the reservoir portion, the fill pipe and the closure member are formed from a moldable thermoset material, thereby eliminating corrosion and minimizing weight.

9. The transmission fluid pump set forth in claim 1 wherein the fill pipe, upon removal of the closure member, is received in the sump extension from the exterior of the sump without removal of the reservoir portion from the transmission housing, whereby the fill pipe can be removed for draining the sump and replaced with another fill pipe of different length to adjust transmission fluid level in the sump.

* * * * *